United States Patent [19]

Nakajima et al.

[11] 4,314,534
[45] Feb. 9, 1982

[54] FEEDBACK CONTROL SYSTEM FOR INTERNAL COMBUSTION ENGINE

[75] Inventors: Yasuo Nakajima, Yokosuka; Kenji Yoneda, Fujisawa, both of Japan

[73] Assignee: Nissan Motor Co., Ltd., Yokohama, Japan

[21] Appl. No.: 146,113

[22] Filed: May 2, 1980

[30] Foreign Application Priority Data

May 7, 1979 [JP] Japan .................... 54-55394

[51] Int. Cl.³ .................... F02M 51/00; F02M 25/06; F02P 3/02
[52] U.S. Cl. .................... 123/438; 123/478; 123/488; 123/494; 123/571; 123/625; 123/626; 123/435
[58] Field of Search ............ 123/435, 438, 478, 488, 123/494, 571, 625, 626

[56] References Cited

U.S. PATENT DOCUMENTS

| | | | |
|---|---|---|---|
| 2,621,642 | 12/1952 | Malick | 123/438 |
| 3,789,816 | 2/1974 | Taplin et al. | 123/494 |
| 4,153,013 | 5/1979 | Bianchi | 123/571 |
| 4,173,205 | 11/1979 | Toelle | 123/571 |
| 4,216,750 | 8/1980 | Kobayashi | 123/435 |
| 4,233,943 | 11/1980 | Rogora et al. | 123/435 |
| 4,240,388 | 12/1980 | Omori et al. | 123/435 |
| 4,249,494 | 2/1981 | Guipaud | 123/435 |

FOREIGN PATENT DOCUMENTS

2434742 2/1976 Fed. Rep. of Germany ...... 123/494

Primary Examiner—Wendell E. Burns
Attorney, Agent, or Firm—Lowe, King, Price & Becker

[57] ABSTRACT

A control system for an internal combustion engine comprises a transducer for issuing a signal representative of combustion pressure in a combustion chamber, a unit consisting of a bandpass filter and a wave-form shaping circuit for issuing a signal representative of existing combustion timing of the combustion chamber by processing the signal from the transducer for detection of rapid increase of the combustion pressure; a reference timing circuit for issuing a signal representative of a predetermined reference combustion timing of the combustion chamber in accordance with operation modes of the engine, a comparator circuit for issuing a signal representative of a difference between the signal from the unit and the signal from the reference timing circuit, and a unit consisting of a discriminating circuit and an actuator driving circuit for controlling the ignition timing, the air-fuel ratio of air-fuel mixture and the amount of exhaust gas recirculated into the intake system of the engine, by processing the signal from the comparator circuit.

6 Claims, 7 Drawing Figures

FEEDBACK CONTROL SYSTEM FOR INTERNAL COMBUSTION ENGINE

FIELD OF THE INVENTION

The present invention relates to a feedback control system for optimally controlling the combustion of an internal combustion engine in accordance with operation modes of the engine.

BACKGROUND OF THE INVENTION

In fuel-injection type internal combustion engines, it is known to employ an open loop type control system which electronically controls the combustion-determination variables such as ignition timing, fuel amount for each combustion, fuel injection timing and exhaust gas amount recirculated such that these variables automatically but independently take their predetermined values in accordance with various operation modes of the engine.

However, in fact, their predetermined values of the combustion-determination variables are not chosen from values which are most suitable for operating the engine effectively and economically. This is because, for safety operation of engine, the determination of such values is made by considering the unavoidable dimensional errors in manufacturing the engine proper, the fuel supply system and spark ignition system, the temperature and pressure changes in atmosphere, and the property variations of fuels to be used.

Apart from the above, it is also known to use for electronically controlling the engine a closed loop type or feedback-type control system which electronically and totally controls the combustion-determination variables such as ignition timing and fuel injection timing in accordance with information signals issued from various sensors which detect the operation condition of the engine.

One of the feedback-type control systems is such constructed that for avoiding knocking phenomenon, the ignition timing is automatically advanced or delayed to be converged to its optimal timing value as much as possible.

In this feedback control system with the knocking avoiding means, a vibration sensor having a bandpass filter is mounted on the engine proper for selectively sensing specific frequency vibration of the engine which is exclusively generated when the knocking occurs. By computing or processing the information signals from the vibration sensor to monitor the degree of knocking condition, the ignition timing is automatically converged to its optimal timing position. (In practical use, however, the setting of the ignition timing is so made as to allow occurrence of slight knocking since the power generating efficiency and fuel consumption of the engine show their optimal values when the ignition timing is set at a position where slight knocking occurs.)

However, in this type feedback control system, a problem arises inevitably because of its inherent arrangement mentioned above. Even under operation without generation of knocking, the engine runs with vibration which contains a considerable amount of components of which frequency matches the specific vibration frequency exclusively generated upon knocking. Thus, higher detecting ability to knocking is not expected from such arrangement, so that accurate feedback control for achieving optimal ignition timing is not achieved.

SUMMARY OF THE INVENTION

According to the present invention, a control system for an internal combustion engine is provided. The system comprises first means for issuing a signal representative of combustion pressure in a combustion chamber of the engine, second means for issuing a signal representative of existing combustion timing of the combustion chamber by processing the signal from the first means for detection of rapid increase of the combustion pressure, a reference timing circuit for issuing a signal representative of a predetermined reference combustion timing of the combustion chamber in accordance with operation modes of the engine, a comparator circuit for issuing a signal representative of a difference between the signal from the second means and the signal from the reference timing circuit, and third means for controlling at least one of engine operating variables consisting of the ignition timing, the air-fuel ratio of air-fuel mixture fed to the engine and the amount of exhaust gas recirculated into an intake system of the engine, by processing the signal from the comparator circuit.

OBJECTS OF THE INVENTION

It is an object of the present invention to provide an improved feedback control system for an internal combustion engine, in which rapid increase of the combustion pressure in a combustion chamber is used as an indicating factor of discriminating the combustion condition of the combustion chamber, and in which the ignition timing, the air-fuel ratio of air-fuel mixture fed to the engine and the amount of exhaust gas recirculated into an intake system of the engine are totally controlled by discriminating the indicating factor.

Other objects and advantages of the present invention will become clear from the following description when taken in conjunction with the accompanying drawings.

DESCRIPTION OF THE INVENTION

Figure 1:
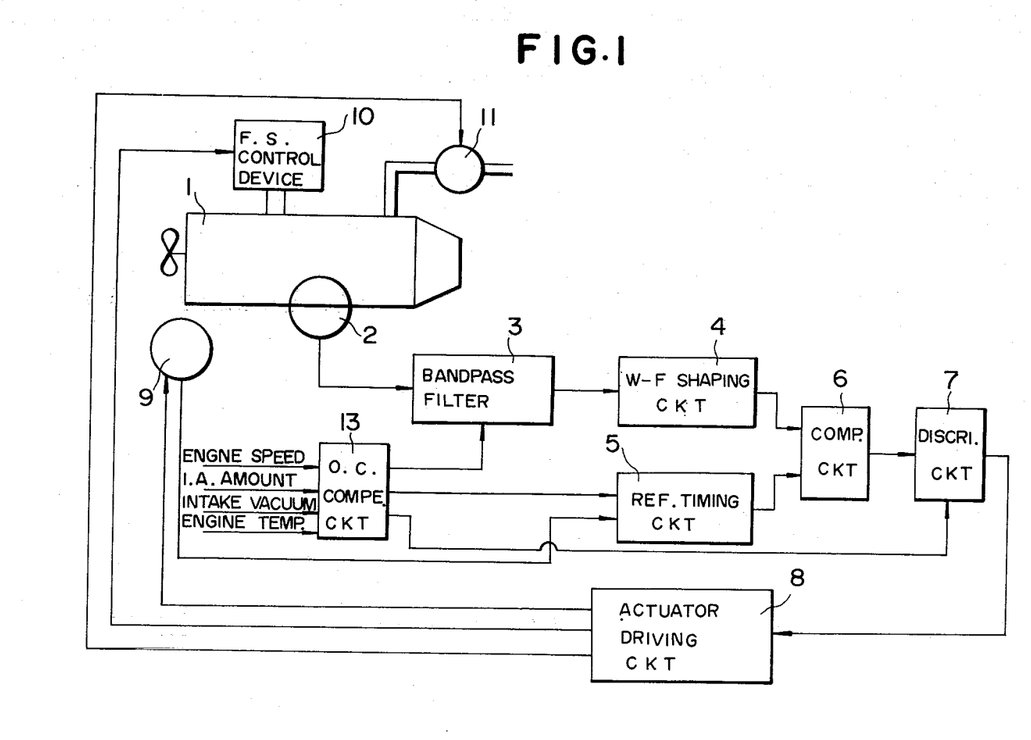
FIG. 1 is a block diagram showing the control system of the present invention.

Referring to FIG. 1, there is shown a block diagram of a feedback control system of the invention. Denoted by numeral 1 is an internal combustion engine. Numeral 2 denotes a transducer which converts the combustion pressure in a combustion chamber into a voltage signal. As such a transducer, a conventional pressure sensor installed in the combustion chamber or a strain gauge attached to a main bearing associated with each piston may be used. Denoted by numeral 3 is a bandpass filter which passes only specific components of the output signal issued from the transducer 2. Denoted by numeral 4 is a wave-form shaping circuit which is designed such that at the moment when receiving from the bandpass filter 16 an output signal of which the magnitude is greater than a predetermined level, it issues as a combustion timing representing signal a single pulse each having a predetermined pulse width which is shorter than that of the later-mentioned reference pulse. If the bandpass filter 3 is of a type which transmits only the component having a single frequency and thus issues a signal having a single sinusoidal wave, the shaping circuit 4 is such designed that at the moment when receiving from the bandpass filter 3 the sinusoidal wave form signal having an amplitude of which magnitude exceeds a predetermined value, the circuit 4 issues the above-mentioned single pulse having the predetermined pulse width shorter than that of the later-mentioned reference pulse. Further, in using the above-mentioned single frequency transmitting bandpass filter, the circuit 4 may be so designed as to detect the output single of the bandpass filter 14 and then smooth the same and issue the above-mentioned single pulse when the envelope signal produced by the smoothed output signal exceeds a predetermined level. Thus, the bandpass filter 3 and the wave-form shaping circuit 4 constitute a so-called combustion timing representing circuit. Numeral 5 denotes a reference timing circuit which issues a reference pulse signal which corresponds to a reference crank timing range representative of the optimal combustion timing in each combustion chamber in accordance with operation modes of the engine upon receiving a crank angle representing signal which may be provided by detecting the operation of for example a distributor installed in a later-mentioned ignition timing control device.

Designated by numeral 6 is a comparator circuit which compares the combustion timing representing signal from the wave-form shaping circuit 4 with the reference pulse signal from the reference timing circuit 5 to detect the timing lag therebetween and issue three deferent signals, the first one being issued when the combustion timing representing signal appears before the reference pulse signal, the second one being issued when the combustion timing representing signal appears after the reference pulse signal, and the third one being issued when the combustion timing representing signal appears within a range of the reference pulse signal. Denoted by numeral 7 is a discriminating circuit which modifies the signal from the comparator circuit 6 by applying thereto the signal issued from an after-mentioned operation mode compensating circuit, and issues a control signal. Denoted by numeral 8 is an actuator driving circuit which drives an ignition timing control device 9, a fuel supply control device 10 and an exhaust gas recirculation control device 11 in accordance with the control signal issued from the discriminating circuit 7. The ignition timing control device 9 may be for example of a type of controlling high voltage applying timing or controlling voltage applied to each spark ignition plug. The fuel supply control device 10 is of a type which controls the air-fuel ratio of the air-fuel mixture fed to the engine. As such a device 10, a conventional electronically controlled fuel supply device installed in a carburetor may be used. Of course, such device 10 may be of a fuel injector control device when employed in a fuel-injector type internal combustion engine such as an electronically controlled gasoline injector type internal combustion engine or a Diesel engine. The exhaust gas recirculation control device 11 is of a type which controls the flow rate of the exhaust gas recirculated to the intake system of the engine. The device 11 may be for example of a conventional valve arranged to vary the section of a passage connecting the exhaust system with the intake system of the engine.

The operation condition compensating circuit 13 is of a type which detects the engine operation condition (mainly the load applied to the engine) by monitering engine speed, intake air amount, intake vacuum, and engine temperature (which may be the temperature of cylinder block, engine cooling water or piston lubricant oil), and applies signals to both the bandpass filter 3 for compensating the selected frequency containing signal provided by the bandpass filter 3, and the reference timing circuit 5 for compensating the reference pulse signal provided by the circuit 5 thereby increasing detecting ability and detecting accuracy to the ignition timing and achieving optimal ignition timing and optimal exhaust gas recirculation both of which delicately depend on the operation condition of the engine.

Figure 2:
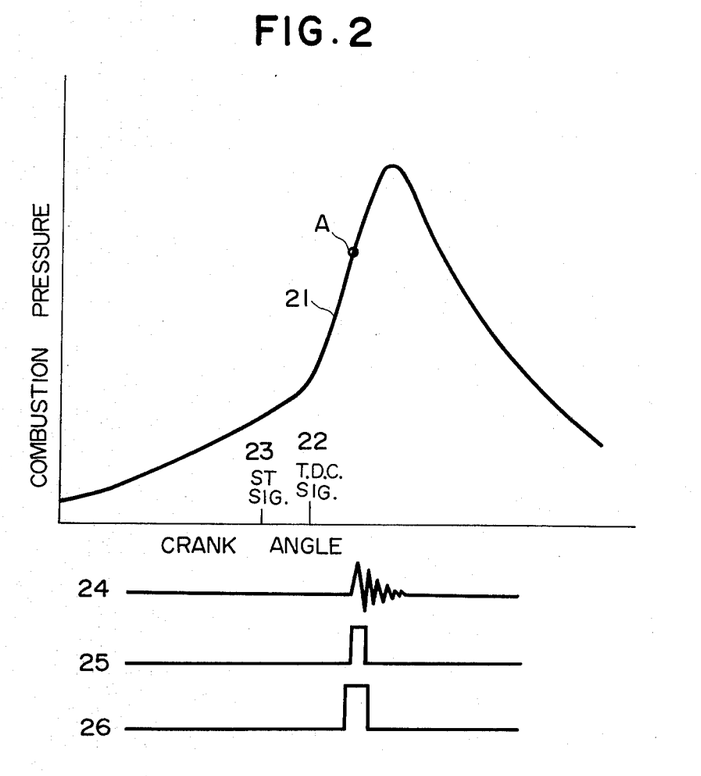
FIGS. 2, 4 and 5 are graphs graphically showing operations of several circuits employed in the control system of FIG. 1 on various modes of the engine.

Assuming that the combustion pressure in a combustion chamber shows a character as indicated by a curve 21 of FIG. 2, the bandpass filter 3 issues a signal indicated by numeral 24 and by receiving the signal 24 the wave-form shaping circuit 4 issues as a combustion timing representing signal a pulse indicated by numeral 25.

As is known, in general, when a signal has higher voltage changing speed, it contains a larger amount of signal component of higher frequency. Thus, by putting this fact into practice, detection of rapid increase of combustion pressure can be made. For this purpose, the bandpass filter 3 is designed to transmit only a component of signal having a predetermined high frequency, and the wave-form shaping circuit 4 is designed to issue a single pulse when the amplitude of the transmitted high frequency signal exceeds a predetermined level thereby to detect a condition wherein the combustion pressure of the combustion chamber is rapidly increased with higher pressure increasing rate than a predetermined rate, which means detection of the combustion timing.

Thus, the wave-form shaping circuit 4 issues as a combustion timing representing signal 25 a single pulse at a point A (see FIG. 2) which represents the time when the combustion pressure is rapidly increased.

The reference timing circuit 5 operates such that by processing both a so-called top dead center signal issued from a crank angle sensor when the piston takes the top dead center position and a so-called start signal issued from the sensor when the piston takes a position which is advanced by a given extent relative to the top dead center position, the reference timing circuit 5 initiates to charge a charge-and-discharge circuit 31 (see FIG. 3) thereof upon receiving the start signal, and initiates discharge the circuit 31 at the moment when it receives the top dead center signal. Further, at the moment when the voltage of the charge-and-discharge circuit 31 is lowered to a predetermined level, the reference timing circuit 5 issues either one of pulses respectively indicated by numerals 32, 33 and 34, each of which is a reference crank range pulse and forms a single pulse.

Figure 3:
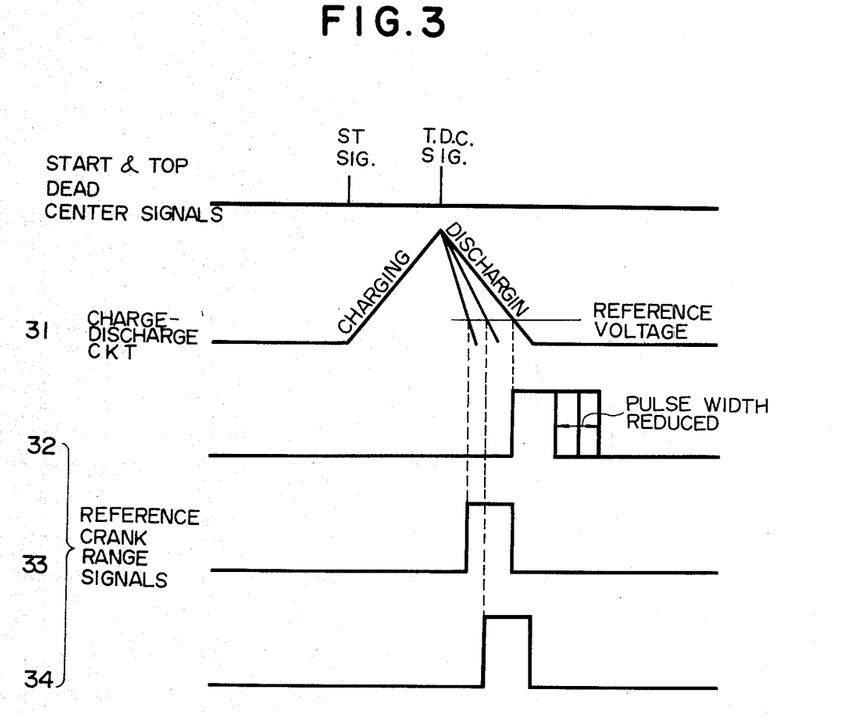
FIG. 3 is a time chart showing operation of a reference timing circuit.

These reference crank range pulses 32, 33 and 34 are pulses representative of suitable combustion timing and used for discriminating and controlling the combustion condition in the combustion chamber. Since it is required to advance the combustion timing and reduce the scattering of the same as the load of the engine is high, the reference timing circuit 5 is such designed that with increase of the load applied to the engine, the discharging rate of the charge-and-discharging circuit 31 becomes high thereby advancing the timing when the single pulse is issued, and simultaneously reducing the pulse width of the single pulse.

As parameters of discriminating the load applied to the engine, engine speed, intake air volume, intake vacuum and engine temperature may be used.

In the condition shown by FIG. 2 wherein the pulse of the combustion timing representing signal 25 is placed within a range of the reference crank range signal 26, the comparator circuit 6 provides, via the discriminating circuit 7 and the actuator driving circuit 8, the ignition timing control device 9, the fuel supply device 10 and the exhaust gas recirculation control device 11 with respective signals for keeping their existing conditions.

Figure 4:
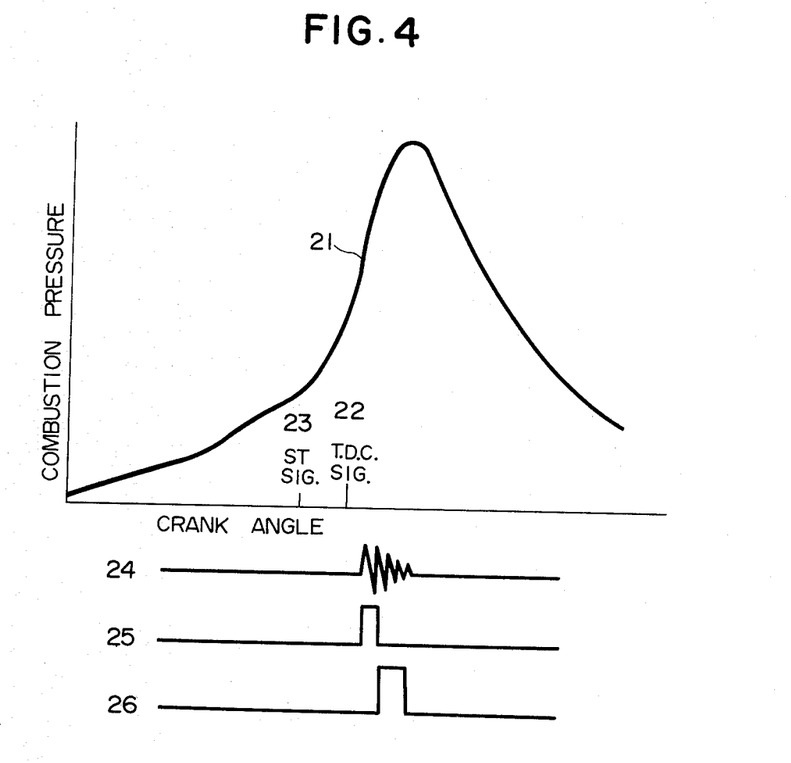

However, in the condition shown by FIG. 4 wherein the pulse of combustion timing representing signal 25 appears in advance of the reference crank range pulse 26 (which means excessively advanced combustion timing), the comparator circuit 6 issues either a signal for delaying the ignition timing or a signal for inriching the air-fuel mixture fed to the engine in order to delay the combustion timing thereby bringing the combustion timing into its optimal timing in a feedback manner. It should be noted that the optimal timing now mentioned means the timing which is given under a predetermined air-fuel ratio and a predetermined exhaust gas recirculation ratio.

Figure 5:
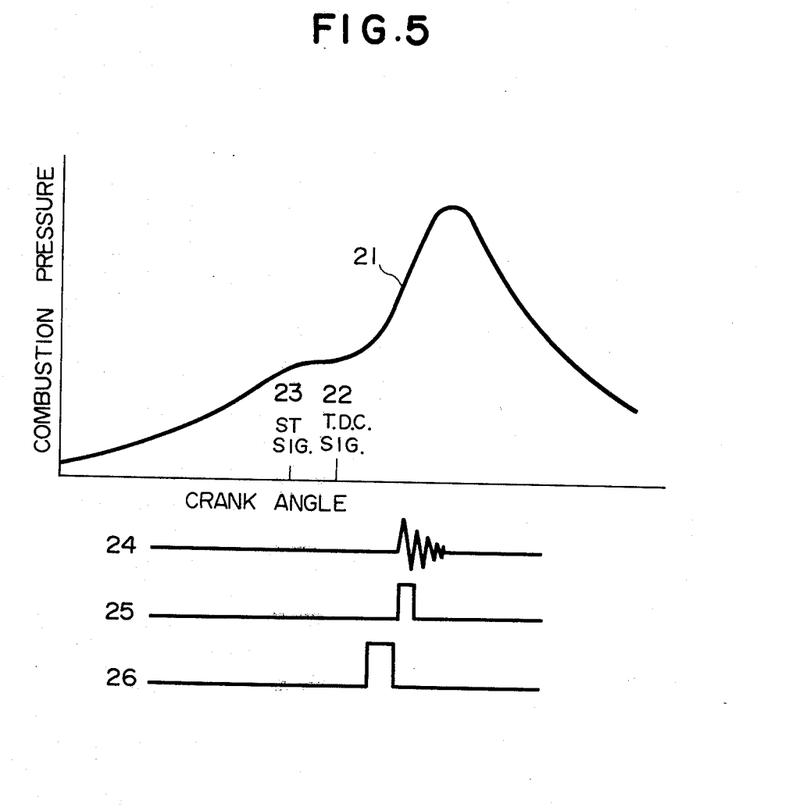

In the condition shown by FIG. 5 wherein the combustion timing detecting signal 25 appears after the pulse of the reference crank range signal 26 (which means excessively delayed combustion timing), the comparator circuit 6 issues either a signal for advancing the ignition timing or a signal for decreasing the amount of the recirculated exhaust gas in order to advance the combustion timing thereby to bring the combustion timing into its optimal timing in a feedback manner.

As is known in the art, in the feedback control system of the type mentioned above, the controlling degrees of controlled variables such as ignition timing, the amount of exhaust gas recirculated, and the amount of fuel fed to the engine depend on the differential value of the combustion timing from its optimal timing. The controlling degree should be increased as such differential value becomes increased. Otherwise, the responsibility of the feedback control becomes poor.

For this purpose, the comparator circuit 6 is such designed that the feedback controlling degree is increased with increase in the differential value of the combustion timing from its optimal timing, thereby to improve the responsibility of the feedback control.

As is also known, when the combustion pressure shows rapid rise, the output signal from the transducer 2 would contain a larger amount of high frequency component. The degree of such rise depends on the operation modes of the engine.

Accordingly, it will be appreciated that if the bandpass filter 3 is designed to transmit only the high frequency signal which is largest in quantity of the components of the signal appearing at such rise, the S-N ratio of the combustion timing detection or the detecting ability becomes improved.

According to the present invention, the operation condition compensating circuit 13 is employed for changing the frequency components selected or transmitted by said bandpass filter 3 in accordance with both the rising degree of the combustion pressure and the operation modes of the engine thereby to much more improve the detecting ability of the combustion timing.

Now, it should be noted that as the ignition timing control device 9, a conventional device of a type which electrically delays or advances the ignition timing or controls the ignition energy may be employed.

Figure 6:
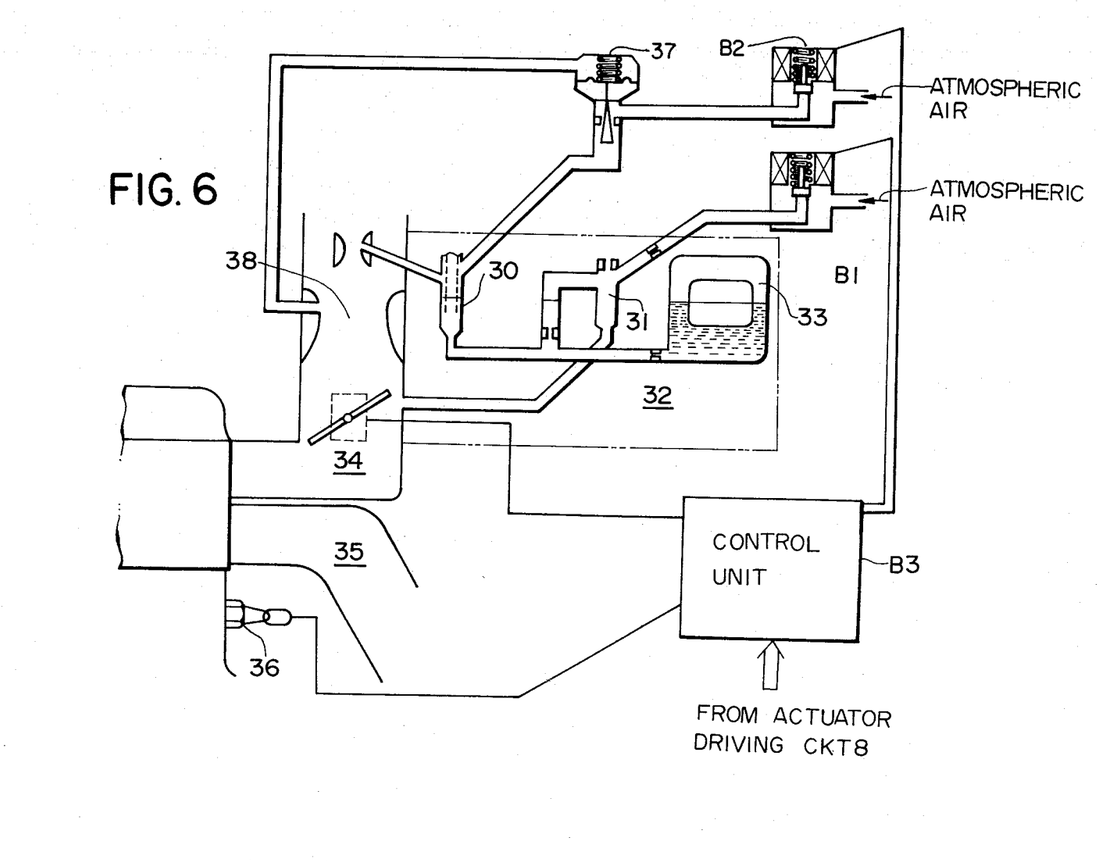
FIG. 6 is a schematic sectional view of a fuel supply control device employable in the control system of the invention.

Furthermore, as the fuel supply control device 10 to be used in an engine having a carburetor, a conventional device shown in FIG. 6 may be employed. The fuel supply control device shown in this drawing comprises two ON-OFF operation solenoid valves $B_1$ and $B_2$ respectively connected to air bleeds 31 and 30 which are respectively associated with a slow system and a main system of the carburetor, as shown. By controlling the opening degrees (or average opening degrees) of the valve $B_1$ and $B_2$, the air-fuel ratio of the air-fuel mixture prepared by the carburetor is determined. Denoted by the reference $B_3$ is a control unit which issues suitable command signals to the valves $B_1$ and $B_2$ in response to application of output signal thereto from the actuator driving circuit 8.

While, in case of using an internal combustion engine equipped with an electrically controlled fuel injectors, the output signal from the actuator driving circuit 8 is fed to a control unit (not shown) of the injectors. It should be noted that numerals 32, 33, 34, 35, 36 and 37 respectively denote a carburetor, a float chamber, an intake manifold, an exhaust manifold, a temperature sensor for measuring the temperature of the engine cooling water, and a variable air bleed for controlling in response to vacuum created at a venturi portion 38 of the carburetor the air flow in an auxiliary air bleed which is associated with the main system of the carburetor as shown.

Figure 7:
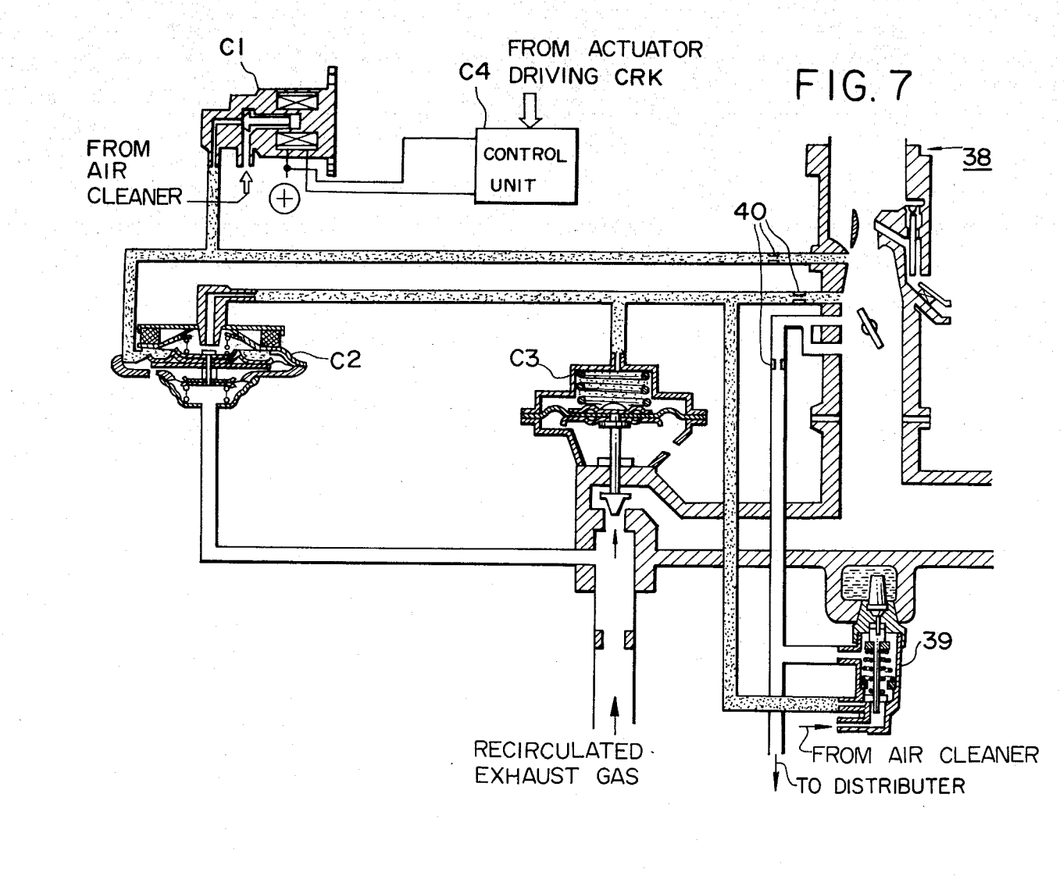
FIG. 7 is a schematic sectional view of an exhaust gas recirculation device employable in the control system of the invention.

Furthermore, as the exhaust gas recirculation device, a conventional device such as one shown in FIG. 7 may be employed. As will be understood from the illustration of this drawing, varying the average opening degree of a VC (vacuum control) solenoid valve $C_1$ controls the operations of valves $C_2$ and $C_3$ with a result that the amount of exhaust gas passing through a passage (no numeral) associated with the valve $C_3$ is varied. Denoted by numerals 38, 39 and 40 are a carburetor, a temperature valve for controlling the vacuum applied to the valves $C_2$ and $C_3$ in accordance with temperature of the engine cooling water, and orifices operatively disposed in passages (no numerals), respectively.

In practice, the above-mentioned system is associated with each of the cylinders of the engine thereby to control in feedback manner the ignition timing and the amount of fuel injected to each combustion chamber. While, in controlling the amount of exhaust gas recirculated and controlling the air-fuel ratio of the air-fuel mixture prepared by a carburetor, the signals respectively representing the combustion conditions of the combustion chambers of the engine are averaged to form an average signal, and the average signal thus formed is used for controlling the ingition timing and the amount of the fuel injected.

From the above, it will be appreciated that in the invention, for achieving optimal combustion in each combustion chamber, the ignition timing, the air-fuel ratio of the air-fuel mixture fed to the engine and the amount of exhaust gas recirculated are totally controlled in a feedback manner by accurately detecting the rapid rise of combustion pressure in each combustion chamber and discriminating the combustion condition in each combustion chamber in accordance with the accurate detection of the rise of the combustion pressure. Thus, the engine equipped with the above-mentioned feedback control system shows improved fuel economy and improved output.

It should be noted that the reference timing circuit 5 comprises a charge-discharge circuit 31, a pulse generating circuit and a time-constant variable circuit. The charge-discharge circuit 31 arranged such that upon receiving a start signal, charging is initiated showing a predetermined charging rate, and upon receiving the top dead center signal, discharging is initiated showing a predetermined discharging rate, the predetermined discharging rate being varied in accordance with the degree of load applied thereto. The pulse generating circuit is arranged to issue a pulse at the moment when the voltage of charge-discharge circuit 31 is lowered to the level corresponding to the predetermined reference voltage. The time-constant variable circuit is arranged to send to the pulse generating circuit a time-constant signal which controls the pulse of the pulse generating circuit in accordance with the load signal applied thereto.

What is claimed is:

1. A control system for an internal combustion engine, comprising:
   first means for issuing a signal representative of combustion pressure in a combustion chamber of said engine;
   second means for issuing a signal representative of existing combustion timing of said combustion chamber by processing said signal from said first means for detection of rapid increase of the combustion pressure;
   a reference timing circuit for issuing a signal representative of a predetermined reference combustion timing of said combustion chamber in accordance with operation modes of said engine;
   a comparator circuit for issuing a signal representative of a difference between the signal from said second means and the signal from said reference timing circuit; and
   third means for controlling at least one of engine operating parameters consisting of the ignition timing, the air-fuel ratio of air-fuel mixture fed to said engine and the amount of exhaust gas recirculated into an intake system of said engine, by processing the signal from said comparator circuit.

2. A control system as claimed in claim 1, in which said second means comprises a bandpass filter which transmits only specific frequency components of the output signal issued from said first means, and a waveform shaping circuit which issues a single pulse when receiving from said bandpass filter an output signal of which magnitude is greater than a predetermined level.

3. A control system as claimed in claim 2, in which said bandpass filter is of a type which transmits only the component having a single frequency and thus issues a signal having a single sinusoidal wave, and in which said wave-form shaping circuit is of a type which issues a single pulse at the moment when receiving from said bandpass filter the sinusoidal waveform signal having an amplitude of which magnitude exceeds a predetermined value.

4. A control system as claimed in claim 2, in which said bandpass filter of said second means is constructed to transmit only specific high frequency components of the output signal issued from said first means.

5. A control system as claimed in claim 2, further comprising an engine operation condition compensating circuit for changing the selected or transmitted frequency components of said bandpass filter in accordance with both the rising degree of the combustion pressure and the operation modes of said engine.

6. A control system as claimed in claim 2, in which said comparator circuit is such constructed that when the single pulse issued from said wave-form shaping circuit appears within a pulse width of an output signal issued from said reference timing circuit, said comparator circuit issues a signal commanding the maintenance of the existing conditions of said engine operating parameters, and when the single pulse from said shaping circuit appears in advance of the pulse from said reference timing circuit, said comparator circuit issues either a signal commanding to delay the ignition timing or a signal commanding to enrich the air-fuel mixture, and when the single pulse from said shaping circuit appears after the pulse from said reference timing circuit, said comparator circuit issues either a signal commanding to advance the ignition timing or a signal commanding to decrease the amount of the recirculated exhaust gas.

* * * * *